Jan. 5, 1926.  1,568,301

G. J. THOMAS

BRAKE APPLYING MECHANISM

Filed Nov. 2, 1925

INVENTOR
GEORGE J. THOMAS
BY
ATTORNEY

Patented Jan. 5, 1926.

1,568,301

UNITED STATES PATENT OFFICE

GEORGE J. THOMAS, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING MECHANISM.

Application filed November 2, 1925. Serial No. 66,270.

*To all whom it may concern:*

Be it known that I, GEORGE J. THOMAS, a citizen of the United States, residing in South Bend, in the county of St. Joseph and State of Indiana, have invented a certain new and useful Improvement in Brake-Applying Mechanism, of which the following is a specification.

This invention relates to brakes, and is illustrated as embodied in an automobile chassis having brakes on all four wheels. An object of the invention is to provide very simple and inexpensive operating connections for the brakes, without interfering with the propeller shaft. Relatively short brake-operating shafts are arranged on opposite sides of the propeller shaft, to be operated together by a novel connecting member offset at its center to clear the propeller shaft.

Figure 1:
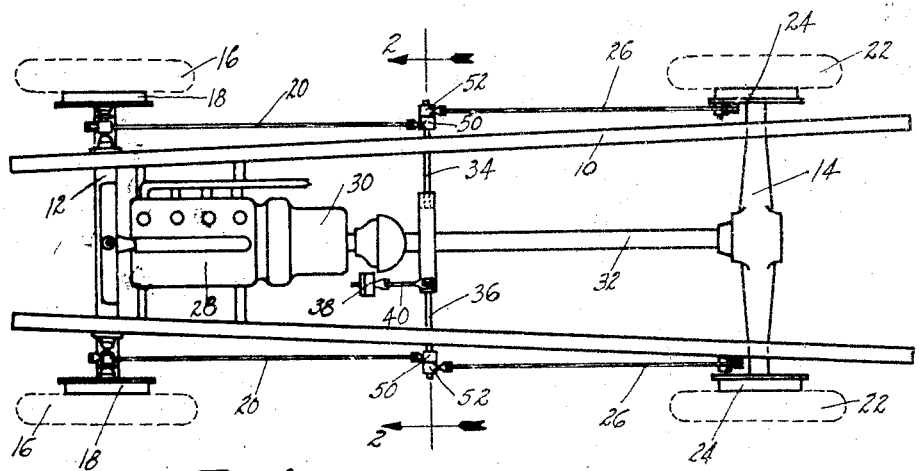
Figure 2:
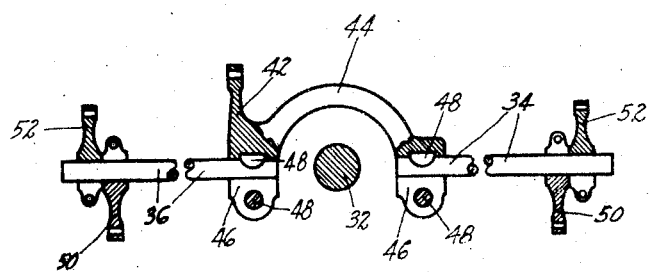

The construction and arrangement of the connecting member, and the advantages of the invention, will be apparent from the following description of the illustrative embodiment shown in the accompanying drawing, in which:

Fig. 1 is a diagrammatic top plan view of an automobile chassis embodying the invention; and Fig. 2 is a view partly in vertical section on the line 2—2 of Fig. 1, and partly in the rear elevation, of the brake-operating shafts and the novel connecting member.

The chassis illustrated includes a frame 10 supported by the usual springs on a front axle 12 and a rear axle 14. Front axle 12 is supported on swivelled wheels 16 having brakes 18 operated by connections 20, and rear axle 14 is supported on driving wheels 22 having brakes 24 operated by connections 26. The vehicle is driven by an engine 28 through a transmission 30 and a propeller shaft 32 extending to the rear axle 14, which contains the usual differential and drive axles (not shown).

The brakes are applied by relatively short cross shafts 34 and 36, substantially coaxial, and arranged on opposite sides of and approximately at the level of the propeller shaft 32. The cross shafts may be journaled in suitable supports formed in or carried by the side members of frame 10, and if desired one or both may have additional support near its inner end.

The shafts are rocked to apply the brakes by means shown as a service pedal 38, acting through a link or the like 40, on an arm 42 which is preferably integral with a novel connecting member 44 secured at its ends to the inner ends of shafts 34 and 36 and bowed or otherwise offset vertically at its center to clear the propeller shaft 32. While member 44 may be made as a casting, I prefer to use a forging having at its ends split sleeves 46 embracing and contracted by bolts 46 about the ends of shafts 34 and 36. Woodruff keys 48 or the like preventing turning of the connecting member on the shafts. Arms 50 at the ends of the shafts are pivoted to connections 20, and arms 52 are pivoted to connections 26.

While one illustrative embodiment has been described in detail, it is not my intention to limit the scope of the invention to that particular embodiment, or otherwise than by the terms of the appended claim.

I claim:

A vehicle having brakes and a vehicle-driving longitudinally-arranged propeller shaft, and comprising, in combination therewith, substantially coaxial brake-applying cross shafts arranged on opposite sides of the propeller shaft with their inner ends approximately on a level with the propeller shaft, and means for rocking said shafts together to apply the brakes including a connecting casting or forging offset at its center to clear the propeller shaft and secured at its ends to the inner ends of the cross shafts, together with an arm at one end of the casting or forging and a brake pedal connected to the arm.

In testimony whereof, I have hereunto signed my name.

GEORGE J. THOMAS.